United States Patent
Kubo

(10) Patent No.: US 6,710,801 B1
(45) Date of Patent: Mar. 23, 2004

(54) IMAGE TAKING AND PROCESSING DEVICE FOR A DIGITAL CAMERA AND METHOD FOR PROCESSING IMAGE DATA

(75) Inventor: Hiroaki Kubo, Mukou (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/534,252

(22) Filed: Mar. 23, 2000

(30) Foreign Application Priority Data

Mar. 29, 1999 (JP) ........................................... 11-086608

(51) Int. Cl.[7] .............................................. H04N 5/228
(52) U.S. Cl. ............................... 348/222.1; 348/240.3; 348/362
(58) Field of Search ........................ 348/207.99, 208.99, 348/208.13, 222.1, 240.99, 240.1, 240.3, 358, 362; 382/300, 284, 293, 294, 298, 299; 358/428

(56) References Cited

U.S. PATENT DOCUMENTS 6,219,464 B1 * 4/2001 Greggain et al. ........... 382/298
6,429,895 B1 * 8/2002 Onuki .................... 348/208.99
6,489,993 B1 * 12/2002 Sato et al. ................ 348/240.3

FOREIGN PATENT DOCUMENTS

JP          08-289188 A      11/1996

* cited by examiner

Primary Examiner—Tuan Ho
(74) Attorney, Agent, or Firm—Sidley Austin Brown & Wood LLP

(57) ABSTRACT

An image processing technique for improving image resolution by increasing an effective number of pixels that represents a captured image. The technique involves obtaining a first exposure and at least a second exposure of an object. The image data of the second exposure differs from the image data of the first exposure in that a focal length for the second exposure differs from that for the first exposure. To the extent there exists a correlation, the image data of the second exposure is used for pixel data for each pixel of the image data of the first exposure requiring resolution improvement. When such correlation does not exist, pixel interpolation is performed using pixel data created by means of calculation for pixel interpolation positions.

12 Claims, 4 Drawing Sheets

Fig. 3
(a)
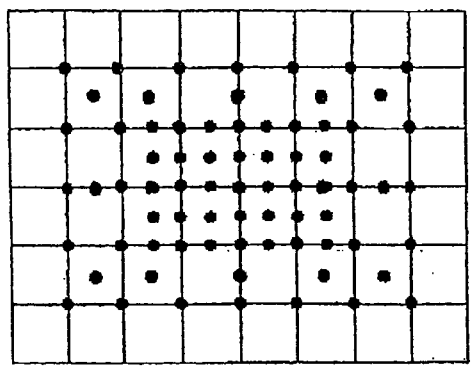
(b)
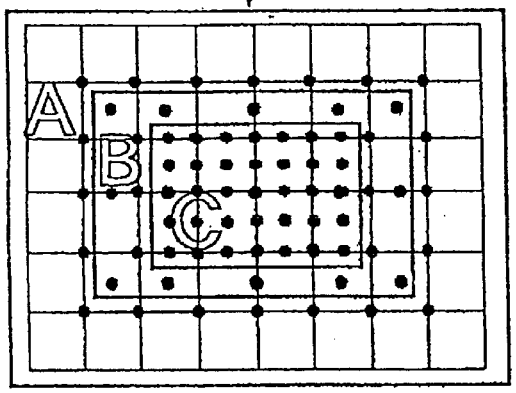
(c)
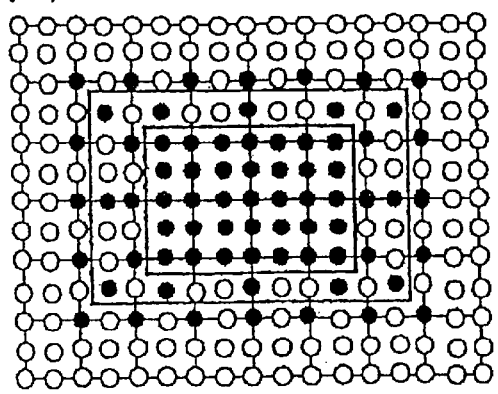

IMAGE TAKING AND PROCESSING DEVICE FOR A DIGITAL CAMERA AND METHOD FOR PROCESSING IMAGE DATA

This application is based on the application No. 11-86608 filed in Japan, the content of which is hereby incorporated by reference.

BACKGROUND OF THE INVENTION

1. Field of the Invention

The present invention pertains to an image taking and processing device for a digital camera and to an image processing method used when increasing the number of pixels of image data. It also pertains to a computer readable medium containing a set of computer executable instructions for processing image data.

2. Description of the Related Art

Generally, the resolution of an image captured by a digital camera is improved by increasing the pixel density of the image sensor. However, when the pixel density of the image sensor is increased, the area of each pixel decreases, leading to a deterioration of pixel sensitivity. On the other hand, if the number of pixels is increased without reducing the size of each pixel, the size of the image sensor increases, which increases its cost.

Therefore, a digital camera is known that offers improved resolution by increasing the apparent number of pixels of the image sensor while leaving the size of the image sensor and the pixel density unchanged.

This digital camera is equipped with an operation switch to instruct that the number of pixels be increased, such that when this operation switch is operated, the resolution increases to double the previous value, for example, in response to the operation of the operation switch.

In the prior art, the number of pixels is increased by creating pixel data for interpolation by performing calculation with reference to peripheral pixels, and then performing pixel interpolation using this pixel data.

In addition, the number of pixels is also increased in a limited part of the image by exposing the photo object with a different angle of view and splicing together parts of the multiple images thus obtained while ensuring that the sizes of the images are the same.

However, there are limits to the degree of resolution improvement that may be obtained by means of pixel interpolation via calculation based on peripheral pixels. In particular, in a digital camera having a zoom function, where wide-angle exposure is performed, the photo object frequency components increase, and a higher resolution is required. As a result, the method of performing pixel interpolation through peripheral pixel calculation entails the drawback that the resulting image suffers from reduced reproducibility regarding the details.

The method involving splicing of image parts suffers from the drawback that that seams stand out, causing the image to appear unnatural.

The present invention was created in order to resolve the problems described above. The first object of the present invention is to provide a digital camera in which the number of pixels in the captured image can be increased without changing the size of the image sensor or the pixel density, and which is capable of capturing images that have good reproducibility regarding details and do not have an unnatural feel.

A second object of the present invention is to provide an image processing method by which to obtain high-resolution images having good reproducibility regarding details.

A third object of the present invention is to provide a recording medium to store a program that executes this image processing method on an image processing device such as a computer.

SUMMARY OF THE INVENTION

The first object is attained by means of an image taking and processing device for a digital camera, the device comprising: at least one image sensor, having a fixed number of pixels, to output image signals responsive to an image taking operation; a selector to select a quantity of pixels to be used in capturing an image, wherein in a first mode of operation the quantity of pixels is greater than the fixed number of pixels; an image taking lens having zoom functionality; a controller, responsive to instructions from the selector, to control an image taking operation; and an image processor, coupled to the at least one image sensor, to process image signals received from the at least one image sensor, wherein in the first mode of operation, (i) the controller is adapted to change a focal length of the image taking lens subsequent to a first exposure and automatically effect a second exposure of a subject object and (ii) the image processor is adapted to perform pixel interpolation for image data obtained from the first exposure, wherein the image processor is adapted to determine whether corresponding pixel data from image data obtained from the second exposure exists for pixel interpolation position of image data obtained from the first exposure, and when such pixel data exists, the image processor is adapted to incorporate such pixel data from image data obtained from the second exposure into the image data obtained from the first exposure.

Using the device having the construction described above, when pixel data of the image data obtained from the second exposure exists that corresponds to the pixel interpolation positions of the image data obtained from the first exposure, the image processor is adapted to incorporate pixel data from image data obtained from the second exposure into the image data obtained from the first exposure. Consequently, the resolution of the area that undergoes pixel interpolation is improved.

Moreover, because pixels are certain to exist at the pixel interpolation positions of the image data obtained from the first exposure due to pixel interpolation, the unnatural feel that results from an image comprising multiple images spliced together does not occur.

The second object is attained by a method for processing image data comprising the steps of: obtaining first image data representative of an object; obtaining second image data representative of the object, wherein the second image data corresponds to a magnification that differs from that of the first image data; resizing at least one of an effective image size of the first image data and the second image data so as to harmonize the effective image sizes of the first image data and the second image data; identifying pixel interpolation positions within the first image data; searching the second image data for pixel data that corresponds to each identified pixel interpolation position of the first image data, which corresponds to specific pixel data of the second image data, with the specific pixel data of the second image data.

Through this method for processing image data, where pixel data of the second image data exists that corresponds to the pixel interpolation positions within the first image data, pixel interpolation for the first image data is performed using specific pixel data of second image data. As a result, the resolution of the area that undergoes pixel interpolation is improved.

The third object of the present invention is attained by a computer readable medium containing a set of computer executable instructions for processing first image data representative of an object and second image data representative of the object, such second image data corresponding to a magnification that differs from that of the first image data, which executable instructions allow a computer to perform the following steps: resizing at least one of an effective image size of the first image data and the second image data so as to harmonize the effective image sizes of the first image data and the second image data; identifying pixel interpolation positions within the first image data; for each identified pixel interpolation position, searching the second image data for specific pixel data that positionally corresponds to such identified pixel interpolation position; and replacing each pixel interpolation position that corresponds to pixel data of the second image data with positionally corresponding pixel data of the second image data.

Using this computer readable medium, the process described above can be performed by means of an image processing device such as a computer, through which images having improved resolution may be obtained when the number of pixels is increased.

BRIEF DESCRIPTION OF THE DRAWINGS

In the following description, like parts are designated by like reference numbers throughout the several drawings.

FIG. 3 is a drawing to explain the pixel interpolation process for the wide-angle image shown in FIG. 2(*a*).

DETAILED DESCRIPTION OF THE PREFERRED EMBODIMENTS

An embodiment of the present invention is explained below with reference to the drawings.

Figure 1:
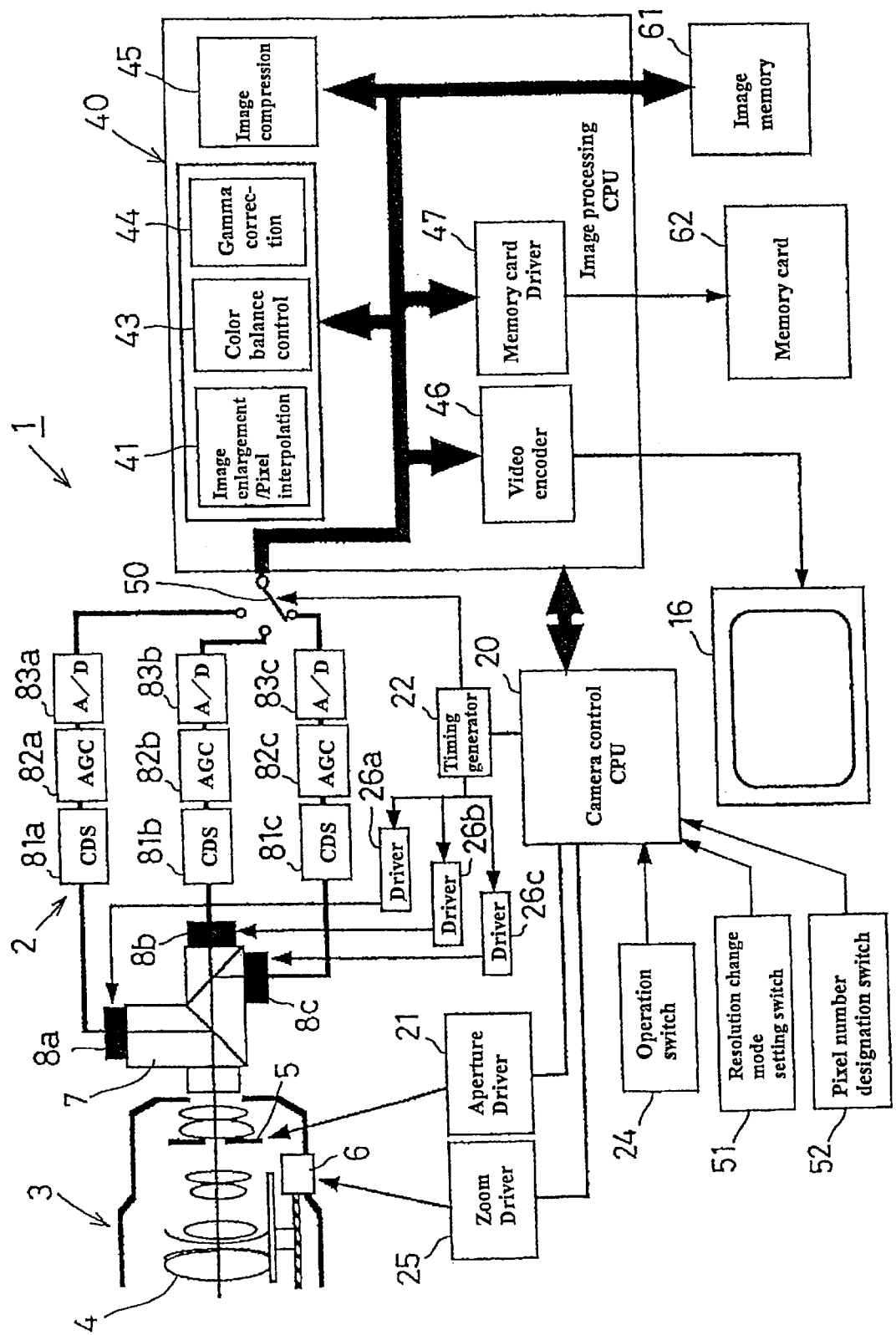
FIG. 1 is a block diagram showing the main mechanical parts and the electrical system of the digital camera pertaining to one embodiment of the present invention.

FIG. 1 is a block diagram showing the main parts and the electrical system of the digital camera pertaining to an embodiment of the present invention.

The digital camera 1 has a camera body 2 having a construction that employs a single-reflex camera using silver halide film, for example. An image taking lens unit 3 is mounted to the front surface of this camera body 2. Mounted in this image taking lens unit 3 are an image taking lens 4, an aperture 5 and an image taking lens drive motor 6. The image taking lens 4 has a zoom function, and the focal length of the image taking lens is changed based on driving by the motor 6.

A prism 7 is placed in the light path of the image taking lens 4, and performs color diffraction of the light from the photo object that enters the camera through the image taking lens 4 into the three primary colors of red (R), green (G) and blue (B). Three image sensors 8*a*, 8*b* and 8*c* comprising CCDs (charge coupled devices) to receive the diffracted light of each color are located on the output side of the prism 7.

A display unit 16, for example, comprising a liquid crystal display (LCD), displays images obtained based on the output from the three image sensors 8*a*, 8*b* and 8*c* and is mounted on the camera body 2. A preview image is displayed on this display unit 16, by which the operator can confirm the photo object image prior to exposure.

In addition, an autofocus (AF) sensor (not shown in the drawing) that detects the distance to the photo object by receiving the light reflected from the photo object, and performs automatic focusing of the image taking lens, is located inside the camera body 2.

The camera control CPU 20 is located inside the camera body 2 and performs control of each part of the camera 1. Specifically, it controls the aperture 5 through an aperture driver 21, and controls the motor 6 through a zoom driver 25. The camera control CPU 20 also controls the image sensors 8*a*, 8*b* and 8*c* through a timing generator 22 and three drivers 26*a*, 26*b* and 26*c* corresponding to the three image sensors.

The camera control CPU 20 calculates exposure control data based on the R, G and B data output from the image sensors 8*a*, 8*b* and 8*c*, respectively, and determines the aperture value for the aperture 5 and the charge accumulation time for the image sensors 8*a*, 8*b* and 8*c*. The camera control CPU 20 also performs feedback control regarding the aperture 5 and the image sensors 8*a*, 8*b* and 8*c*, so that the aperture value and charge accumulation time are achieved.

A resolution change mode setting switch 51, a pixel number designation switch 52 and other operation switches 24 are connected to the camera control CPU 20. The resolution change mode setting switch 51 is operated when the operator desires to change the resolution (increase the number of pixels). When it is operated once, the resolution change mode is specified, and if it is operated once again, normal image recording mode is specified. When operated while the resolution change mode is present, the pixel number designation switch 52 increases the number of pixels to a desired value. The camera operation switches 24 include a shutter release button and a power switch not shown in the drawing.

The camera control CPU 20 performs relevant processes in response to the input from the operation of the resolution change mode setting switch 51, the pixel number designation switch 52, the shutter button, etc. For example, when the resolution change mode is specified by means of the resolution change mode setting switch 51 and a value for the increased number of pixels is designated by means of the pixel number designation switch 52, following a normal exposure, the camera control CPU 20 drives the motor 6 via the zoom driver 25, changes the focal length of the image taking lens 4 at least once in the direction of enlargement (the telephoto direction), and performs exposure for the purposes of improved resolution. The details of this operation are described below.

The image sensors 8*a*, 8*b* and 8*c* perform photoelectric conversion of the R, G and B components, respectively, of the optical image of the photo object and output the resulting signals. This optical image undergoes color diffraction by means of the prism 7 after it enters the image taking lens 4.

The timing generator 22 generates drive control signals for the image sensors 8*a*, 8*b* and 8*c* as well as control signals for the alternating switch 50 based on standard clock signals output from the camera control CPU 20. The timing generator 22 generates clock signals such as timing signals for starting and completing integration (starting and completing exposure), and read control signals regarding received light signals from each pixel (horizontal and vertical synchronization signals, transmission signals, etc.), and outputs them to the image sensors 8*a*, 8*b* and 8*c* via their respective drivers 26*a*, 26*b* and 26*c*.

When charge accumulation in the image sensors 8a, 8b and 8c is completed, the photo object image signals that have undergone photoelectric conversion are shifted to the transmission path in each image sensor and are respectively read out from the transmission path via the buffer. The output thus read undergoes signal processing by means of CDS (correlation double sampling) circuits 81a, 81b and 81c, AGC (auto-gain control) circuits 82a, 82b and 82c and A/D converters 83a, 83b and 83c corresponding to the image sensors 8a, 8b and 8c, respectively.

The CDS circuits 81a, 81b and 81c perform noise reduction processing to the image signals through sampling. The AGC circuits 82a, 82b and 82c perform sensitivity level adjustment regarding the image signals through gain adjustment. The A/D converters 83a, 83b and 83c convert the analog signals normalized by the AGC circuits 82a, 82b and 82c into 10-bit digital signals.

The image processor 40 performs image processing to the output from the A/D converters 83a, 83b and 83c and creates an image file. It is controlled by the image processing CPU.

The signals from the A/D converters 83a, 83b and 83c are received by the image processor 40 while the alternating switch 50 switches the signals from one pixel to the next. The received signals are written to the image memory 61 synchronously with the read-out of the signals from the image sensors 8a, 8b and 8c. The data in the image memory 61 is then accessed and undergoes processing by each block.

The image enlargement/pixel interpolation block 41 located in the image processor 40 has a function to enlarge the image data. When the resolution change mode has been specified by means of the resolution change mode setting switch 51 and a prescribed number of pixels has been designated by means of the pixel number designation switch 52, the image enlargement/pixel interpolation block 41 creates image data for purposes of pixel interpolation by means of calculation and performs pixel interpolation, and increases the number of pixels to the designated number. The image enlargement/pixel interpolation block 41 also performs processing to substitute the prescribed pixel data based on the multiple items of image data described below. The processing performed by the image enlargement/pixel interpolation block 41 is performed for each of the colors of R, G and B.

The color balance control block 43 independently corrects the gain of the R, G and B outputs from the image enlargement/pixel interpolation block 41 and performs white balance adjustment of each. White balance is a control process wherein the areas of the photo object which are deemed to be white originally are presumed from the brightness and chromatic data, and the average values of R, G and B and the R/G and B/G values are sought from the previous R, G and B outputs to correct the R and B output gain values.

The gamma correction block 44 performs non-linear conversion of the R, G and B outputs to which white balance processing has been performed by the color balance control block 43. Gradation conversion appropriate to the display unit 16 is performed here. The gamma-corrected image data is stored in the image memory 61.

The image compression block 45 calls out the image data for the captured image from the image memory 61 and performs compression processing to it. After it is compressed, the image data is recorded in a memory card 62 by means of a memory card driver 47.

The memory card 62 is detachably mounted in a prescribed location in the camera body 2 of the digital camera 1.

The video encoder 46 calls out the image data stored in the image memory 61, encodes it in NTSC/PAL format and then displays it on the display unit 16. When a preview is performed, the image is updated at prescribed intervals, and the image is displayed on the display unit 16 in accordance with the motion picture rate. After exposure, the captured image is shown on the display unit 16 and the preview image display is resumed after a prescribed period of time has elapsed.

Next, the principle of improvement of the resolution when the resolution change mode is specified in the digital camera 1 shown in FIG. 1 will be explained.

Because the number of frequency components of the normal photo object increases when wide-angle exposure is performed, it is required that the image has a higher resolution than when telephoto exposure is performed. As a result, even if the image resulting from wide-angle exposure undergoes pixel interpolation using pixel interpolation data created through calculation and the number of pixels is increased accordingly, the resulting image will still suffer from reduced reproducibility regarding the details.

Therefore, when a resolution change mode is specified for a wide-angle image using the resolution change mode setting switch 51 and the number of pixels is designated by means of the pixel number designation switch 52, pixel interpolation data is created by means of calculation and the pixels in the center of the image are replaced by pixels comprising image data for resolution improvement obtained through enlarged exposure based on a different focal length for the image taking lens 4.

Figure 2:
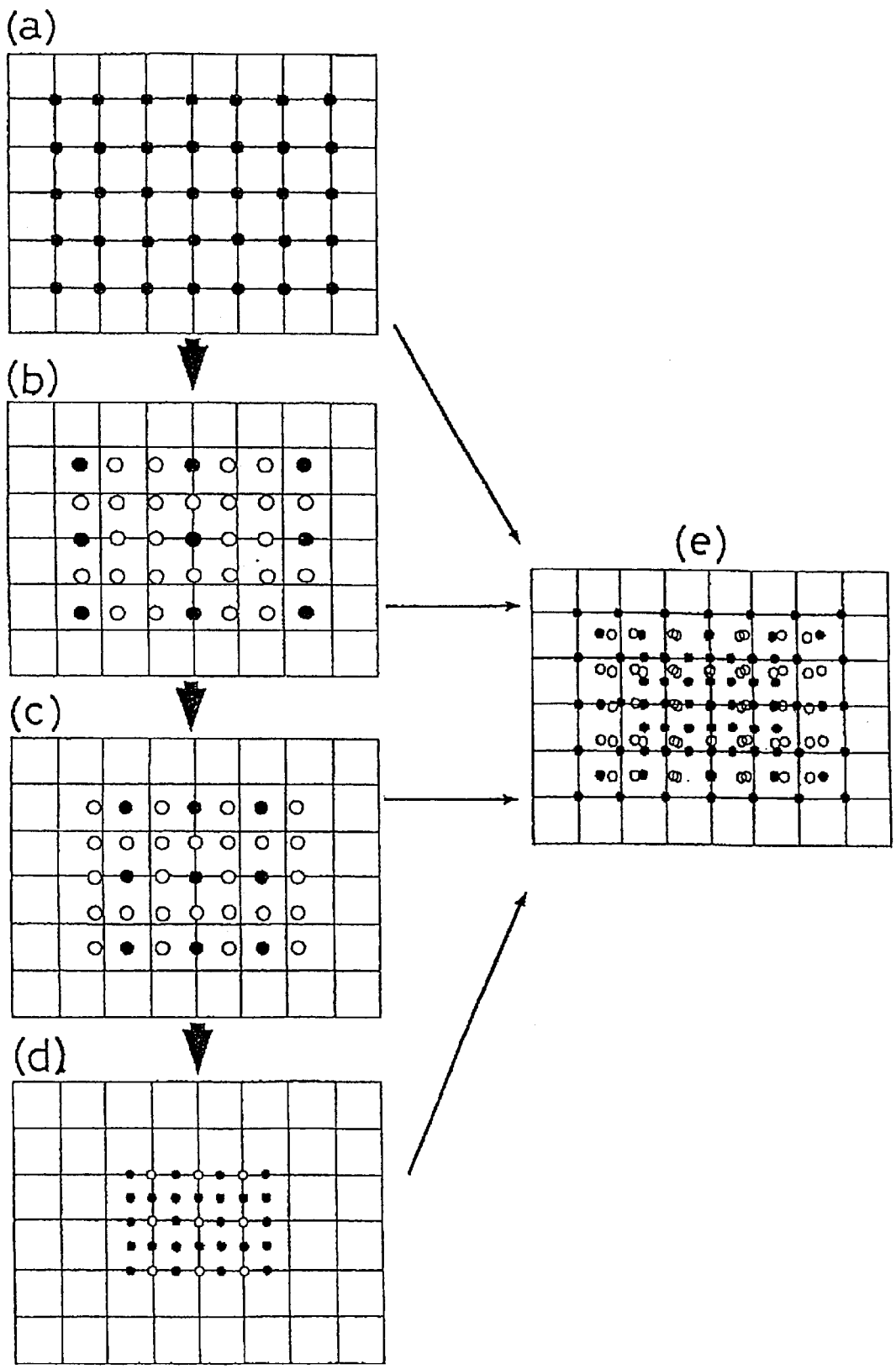
FIG. 2 comprises conceptual drawings showing the principle by which resolution is improved.

FIG. 2 is a conceptual diagram showing the principle by which the resolution is improved.

The lattice intersection dots in FIG. 2 show the positions of pixels during wide-angle exposure. FIG. 2(a) shows the state of the pixels when wide-angle exposure is performed. The black dots in FIG. 2 indicate pixels that can be used as pixel data when pixel interpolation is performed to increase the number of pixels.

When it is instructed that the number of pixels is to be increased using the pixel number designation switch 52, the motor 6 is driven to change the focal length of the image taking lens 4 and to perform enlarged exposure in addition to a normal exposure. In this embodiment, the focal length is changed and exposure for resolution improvement performed three times, and the resulting images are recorded in the image memory 61.

To ensure that the size of the photo object in each image is the same, the image size is magnified by means of the image enlargement/pixel interpolation block 41. FIG. 2(b) shows the pixel positions where exposure is performed with the focal length changed in the telephoto (enlargement) direction relative to the wide-angle exposure shown in FIG. 2(a), and the image size is kept the same as in FIG. 2(a). The pixels represented by black dots in FIG. 2(b) correspond to the pixel positions, or the interpolation positions, in the wide-angle image shown in FIG. 2(a).

FIG. 2(c) shows the pixel positions where the exposure is further enlarged beyond the situation shown in FIG. 2(b) and the image size is kept the same as in FIG. 2(a). The pixels represented by black dots in FIG. 2(c) correspond to the pixel positions, or the interpolation positions, in the wide-angle image shown in FIG. 2(a).

FIG. 2(d) shows the pixel positions where the exposure is further enlarged and the image size is kept the same as in FIG. 2(a). The pixels represented by black dots in FIG. 2(d) correspond to the pixel positions, or the interpolation positions, in the wide-angle image shown in FIG. 2(a).

When the four images shown in (a) through (d) of FIG. 2 are superimposed, the result is shown in FIG. 2(e). As seen from the positions of the black dots in this drawing, many of the pixels of the image data obtained through enlarged exposure for resolution improvement reside in the pixel positions or the pixel interpolation positions that are particularly in the center of the image data shown in FIG. 2(a).

FIG. 3 is a drawing to explain the pixel interpolation process performed to the wide-angle image shown in FIG. 2(a).

FIG. 3(a) shows only the black dots in FIG. 2(e). As shown in FIG. 3(b), areas (A) through (C) surrounded by frames are created to mark off the image data shown in FIG. 3(a). In area (A), pixel data obtained through exposure for resolution improvement does not exist at the pixel interpolation positions. Therefore, for area (A), pixel interpolation is performed through calculation by the image enlargement/pixel interpolation block 41 based on the wide-angle exposure image data shown in FIG. 2(a).

Area (B) contains pixel interpolation positions where pixel data obtained through exposure for resolution improvement does reside and pixel interpolation positions where said pixel data does not reside. Therefore, for area (B), pixel interpolation using this pixel data is performed for pixel interpolation positions where the pixel data does reside. On the other hand, pixel interpolation using pixel data sought through calculation is performed for pixel interpolation positions where the pixel data does not reside.

In area (C), pixel data obtained through exposure for resolution improvement resides at all pixel interpolation positions. Therefore, pixel interpolation is performed for all of these pixel interpolation positions using the pixel data described above, and pixel interpolation based on calculation is not performed.

The pixel arrangement when the image is enlarged to double the previous size through pixel interpolation is shown in FIG. 3(c). In FIG. 3(c), the black dots indicate pixel data obtained through actual exposure, and the white dots indicate pixel data created through calculation.

As seen from FIG. 3(c), interpolation is done for the center of the image using pixels created based on the optically enlarged image, thereby improving resolution. In addition, interpolation is carried out for the peripheral areas using pixels created through calculation, leaving the resolution unchanged from the usual method. In normal exposure, the main photo object is usually located in the center of the image. Therefore, an image in which the main photo object has improved resolution may be obtained.

While it is acceptable if the pixel data for the wide-angle exposure pixel positions is used as is, where pixel data from exposure for resolution improvement exists, replacing the pixel data from the wide-angle exposure with the latter pixel data will result in superior resolution. In addition, in the above example, three enlarged exposures for resolution improvement were used, but only one, or two, or four or more may also be used.

Figure 4:
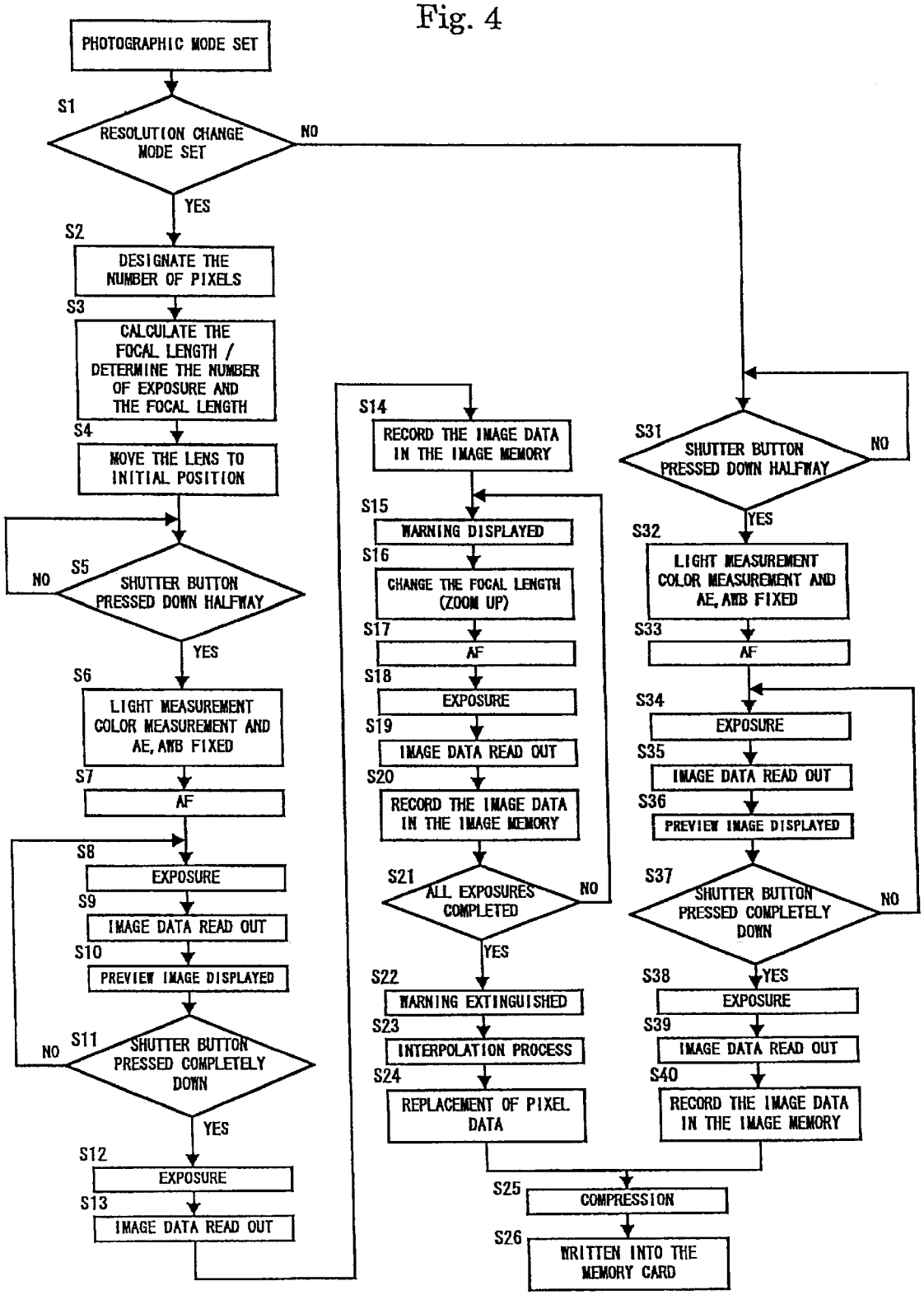
FIG. 4 is a flow chart showing the operation of the digital camera shown in FIG. 1.

Next, the operation of the digital camera shown in FIG. 1 will be explained with reference to the flow chart shown in FIG. 4. In FIG. 4 and in the following explanation, 'step' will be abbreviated as 'S'.

First, in S1 it is determined by the camera control CPU 20 whether or not the operator has set the camera to resolution change mode by means of the resolution change mode setting switch 51. If the camera has been set to resolution change mode (YES in S1), the operator designates the number of pixels in S2 by means of the pixel number designation switch 52. When designating the number of pixels, the double magnification explained with reference to FIG. 3(c) may be used, or a specific number of pixels may be set.

The camera control CPU 20 calculates the focal length for performing enlarged exposure for resolution improvement in S3 based on the number of pixels input in S2, and then determines the number of exposures to be performed for resolution improvement and the focal length for each exposure.

After moving the image taking lens 4 to the wide-angle exposure position, which is the initial position, in S4, the camera control CPU 20 waits for the shutter release button to be pressed down halfway in S5.

When the shutter release button is pressed down halfway, (YES in S5), light measurement and color measurement are performed and the exposure control value and white balance control value are fixed in S6. Auto-focusing is then performed in S7.

In S8, the image sensors 8a through 8c are exposed such that the optical image of the photo object is received by each image sensor, and photoelectric conversion is then performed. After a prescribed period of exposure time elapses, the image data accumulated in the image sensors 8a through 8c is read out in S9 and prescribed image processing is performed by the image processor 40. The image obtained through the image processing is displayed on the display unit 16 as a preview image. This operation is repeated until the shutter release button is pressed completely down in accordance with a prescribed cycle, such that the preview image is displayed on the display unit 16 on a real-time basis (S10).

When the shutter release button is pressed completely down (YES in S11), exposure of the image sensors 8a through 8c is performed in S12 and the image data is read out in S13. The captured image to which prescribed image processing was performed by the image processor 40 is then temporarily recorded in the image memory 61 in S14. Up to this point, the image recording operation is identical to conventional operation.

Next, in S15, a warning to hold the camera 1 still in order to perform exposure for resolution improvement is displayed on the display unit 16.

After the focal length of the image taking lens 4 is changed by zooming in the image taking lens 4 in S16, auto-focusing is performed in S17 and the image sensors are exposed in S18. After the image data has been read out and prescribed processing is performed in S19, the image data is temporarily recorded in the image memory 61 in S20. Where exposure for resolution improvement is to be performed two or more times (NO in S21), the operations of S15 through S20 are repeated until all exposures for resolution improvement are completed, and image data for each of the different focal lengths of the image taking lens 4 is obtained.

When all exposures for resolution improvement are completed, (YES in S21), the warning display shown in S22 is extinguished. In S23, pixel interpolation based on calculation regarding the peripheral pixels is performed, and the number of pixels in the first image is increased to the number designated.

In S24, replacement is performed for the pixel data obtained from exposure for resolution improvement. Specifically, first, the magnification of the image for resolution improvement is changed so that the image size for resolution improvement will equal the image size in the first image. Next, where pixels of the image for resolution improvement exist in the pixel interpolation positions or pixel positions in the first image, the image enlargement/pixel interpolation block 41 replaces the pixels of the first image with the pixels of the image for resolution improvement. Through this process, pixels for the optically enlarged image are placed in the center of the first image, thereby improving resolution. Naturally, the total number of pixels in the first image equals a designated number of pixels. Pixels always exist for the pixel interpolation positions in the first image, and there is no localized increase in the pixel density. As a result, a natural image that does not appear odd is obtained.

In this way, after being compressed by means of the image compression block 45 in S25, the image for which the number of pixels was increased through pixel interpolation is written into the memory card 62 in S26.

Where it is determined in S1 that the resolution change mode is not specified, normal digital camera operation is performed, and the operations of S5 through S14 are performed in S31 through S40.

After being compressed by the image compression block 45 in S25, the image temporarily recorded in the image memory 61 is written into the memory card 62 in S26.

In the above embodiment, a situation was described in which the interpolation for the first image was performed by the image processor 40 based on an instruction from the camera control CPU 20 in the digital camera, but it is also acceptable if the program that executes the program to change the sizes of the photo object images and the interpolation process for the first image is stored in a recording medium such as a CD-ROM or floppy disk. It is also acceptable if this program is externally installed onto an image processing device such as a computer and this device performs image processing to the first image data, which is separately prepared, as well as to the image data for resolution improvement.

Using the digital camera and image processing method pertaining to the present invention, where pixel data for resolution improvement corresponding to the pixel interpolation positions in the first image data exists, pixel interpolation for this first image is performed using the actual pixel data in which the photo object image is optically enlarged. Therefore, the resolution of the area that underwent pixel interpolation is improved, and a high-resolution image offering superior reproducibility regarding the details may be obtained without changing the size of the image sensors or the pixel density.

Moreover, because the present invention does not improve the resolution using the partial image splicing method, the problem of the spliced areas appearing different and unnatural does not occur.

Furthermore, using the recording medium of the present invention, the image processing pertaining to the present invention can be performed in an image processing device such as a computer, and a high-resolution image offering superior reproducibility regarding the details may be obtained by means of this image processing device.

Although the present invention has been fully described by way of examples with reference to the accompanying drawings, it is to be noted that various changes and modifications will be apparent to those skilled in the art. Therefore, unless such changes and modifications otherwise depart from the scope of the present invention, they should be construed as being included therein.

It is claimed:

1. An image taking and processing device for a digital camera, the device comprising:

at least one image sensor, having a fixed number of pixels, to output image signals responsive to an image taking operation;

a selector to select a quantity of pixels to be used in capturing an image, wherein in a first mode of operation the quantity of pixels is greater than the fixed number of pixels;

an image taking lens having zoom functionality;

a controller, responsive to instructions from the selector, to control an image taking operation; and an image processor, coupled to the at least one image sensor, to process image signals received from the at least one image sensor, wherein in the first mode of operation, (i) the controller is adapted to change a focal length of the image taking lens subsequent to a first exposure and automatically effect a second exposure of a subject object and (ii) the image processor is adapted to perform pixel interpolation for image data obtained from the first exposure, wherein the image processor is adapted to determine whether corresponding pixel data from image data obtained from the second exposure exists for pixel interpolation position of image data obtained from the first exposure, and when such pixel data exists, the image processor is adapted to incorporate such pixel data from image data obtained from the second exposure into the image data obtained from the first exposure.

2. A device in accordance with claim 1, wherein the image processor is adapted to calculate pixel data for each pixel interpolation position of the image data obtained from the first exposure and not otherwise replaced by pixel image data of the second exposure.

3. A device in accordance with claim 1, wherein the image processor is adapted to resize an effective image size of the image data obtained from the second exposure in accordance with an effective image size of the image data obtained from the first exposure.

4. A device in accordance with claim 3, wherein the image processor is adapted to calculate pixel data for each pixel interpolation position of the image data obtained from the first exposure and not otherwise replaced by pixel image data of the second exposure.

5. A method for processing image data, comprising the steps of:

obtaining first image data representative of an object;

obtaining second image data representative of the object, wherein the second image data corresponds to a magnification that differs from that of the first image data;

resizing at least one of an effective image size of the first image data and the second image data so as to harmonize the effective image sizes of the first image data and the second image data;

identifying pixel interpolation positions within the first image data;

searching the second image data for pixel data that corresponds to each identified pixel interpolation position; and replacing each pixel interpolation position of the first image data, which corresponds to specific pixel data of the second image data, with the specific pixel data of the second image data.

6. A method for processing image data in accordance with claim 5, further comprising the step of calculating pixel data for each pixel interpolation position not otherwise subject to replacement.

7. A method for processing image data, comprising the steps of:

receiving first image data representative of an object;

receiving additional image data, the additional image data being representative of the object but comprises image data of a plurality of magnifications that each differ from a magnification of the first image data;

identifying pixel interpolation positions within the first image data;

searching the additional image data for pixel data that corresponds to each identified pixel interpolation position; and replacing each pixel interpolation position of the first image data, which corresponds to specific pixel data of the additional image data, with the specific pixel data of the additional image data.

8. A method for processing image data in accordance with claim 7, further comprising the step of resizing at least one of an effective image size of the first image data and the additional image data so as to harmonize the respective image sizes of the first image data and the additional image data.

9. A computer readable medium containing a set of computer executable instructions for processing first image data representative of an object and second image data representative of the object, such second image data corresponding to a magnification that differs from that of the first image data, which executable instructions allow a computer to perform the following steps:

resizing at least one of an effective image size of the first image data and the second image data so as to harmonize the effective image sizes of the first image data and the second image data;

identifying pixel interpolation positions within the first image data;

for each identified pixel interpolation position, searching the second image data for specific pixel data that positionally corresponds to such identified pixel interpolation position; and replacing each pixel interpolation position that corresponds to pixel data of the second image data with positionally corresponding pixel data of the second image data.

10. A computer readable medium containing a set of computer executable instructions for processing image data, which executable instructions allow a computer to perform the following steps:

obtaining first image data representative of an object;

obtaining additional image data, the additional image data being representative of the object but comprises image data of a plurality of magnifications that each differ from a magnification of the first image data;

resizing at least one of an effective image size of the first image data and the additional image data so as to establish a single effective image size for the first image data and the additional image data;

identifying pixel interpolation positions within the first image data;

for each identified pixel interpolation position, searching the additional image data for pixel data that positionally corresponds to such identified pixel interpolation position; and replacing each pixel interpolation position that positionally corresponds to pixel data of the additional image data by using such pixel data of the additional image data.

11. A method for obtaining and subsequently processing image data for a digital camera having a taking lens with zoom capabilities, the method comprising the steps of:

effecting a first exposure to obtain first image data representative of an object;

modifying a focal length of the taking lens and effecting a second exposure at the modified focal length to obtain second image data representative of the object;

resizing at least one of an effective image size of the first image data and the second image data so as to harmonize an effective image size of the first image data and the second image data;

identifying pixel interpolation positions within the first image data;

searching the second image data for pixel data that corresponds to each identified pixel interpolation position; and replacing each pixel interpolation position that corresponds to pixel data of the second image data with pixel data of the second image data.

12. A method for processing image data in accordance with claim 11, further comprising the step of calculating pixel data for each pixel interpolation position not otherwise subject to replacement.

* * * * *